Nov. 17, 1959     R. W. PARLIN     2,913,184
ON-OFF HUMIDIFYING SYSTEMS
Filed July 17, 1956     2 Sheets-Sheet 1
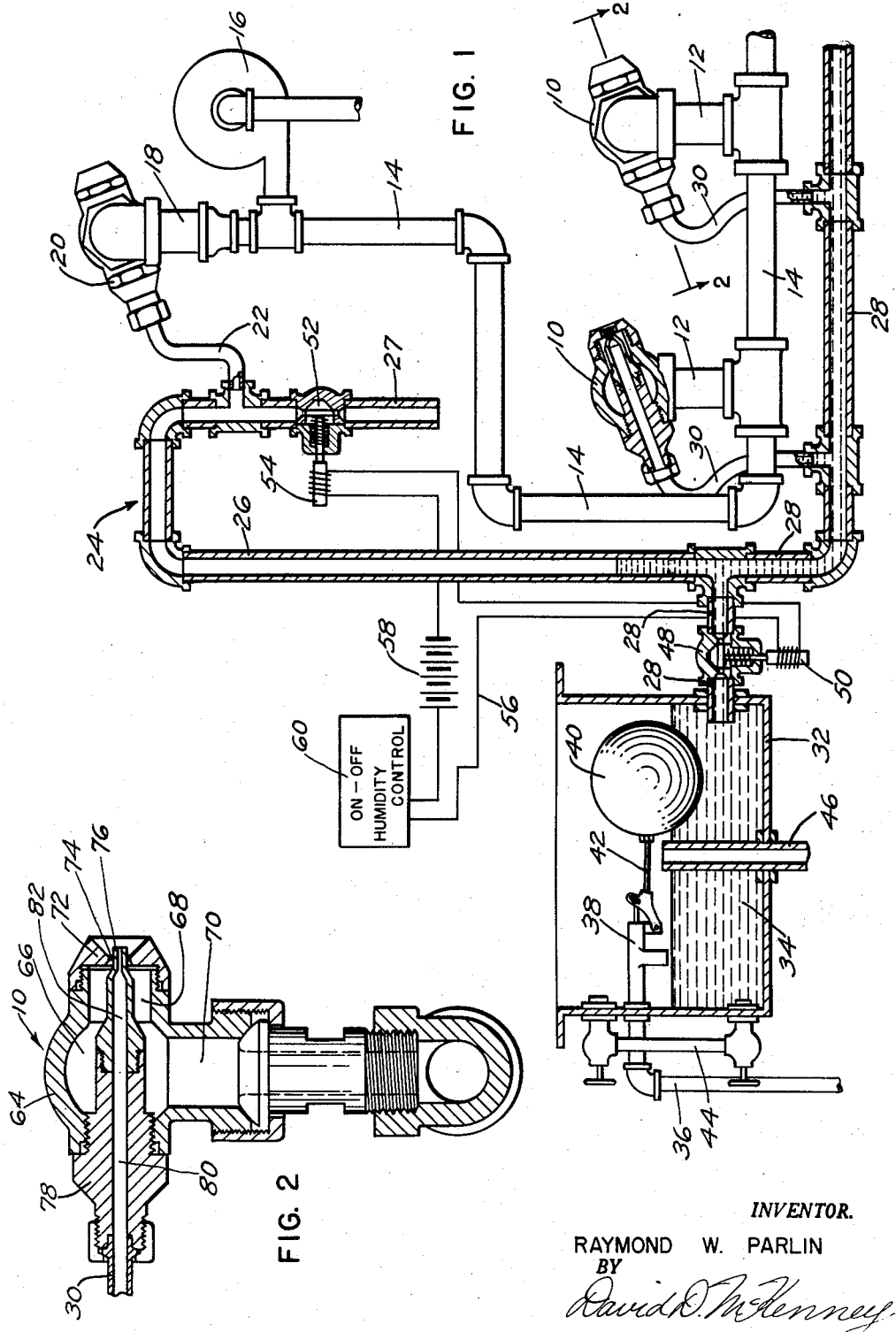
INVENTOR.
RAYMOND W. PARLIN
BY
*David D. McKenney*
ATTORNEY

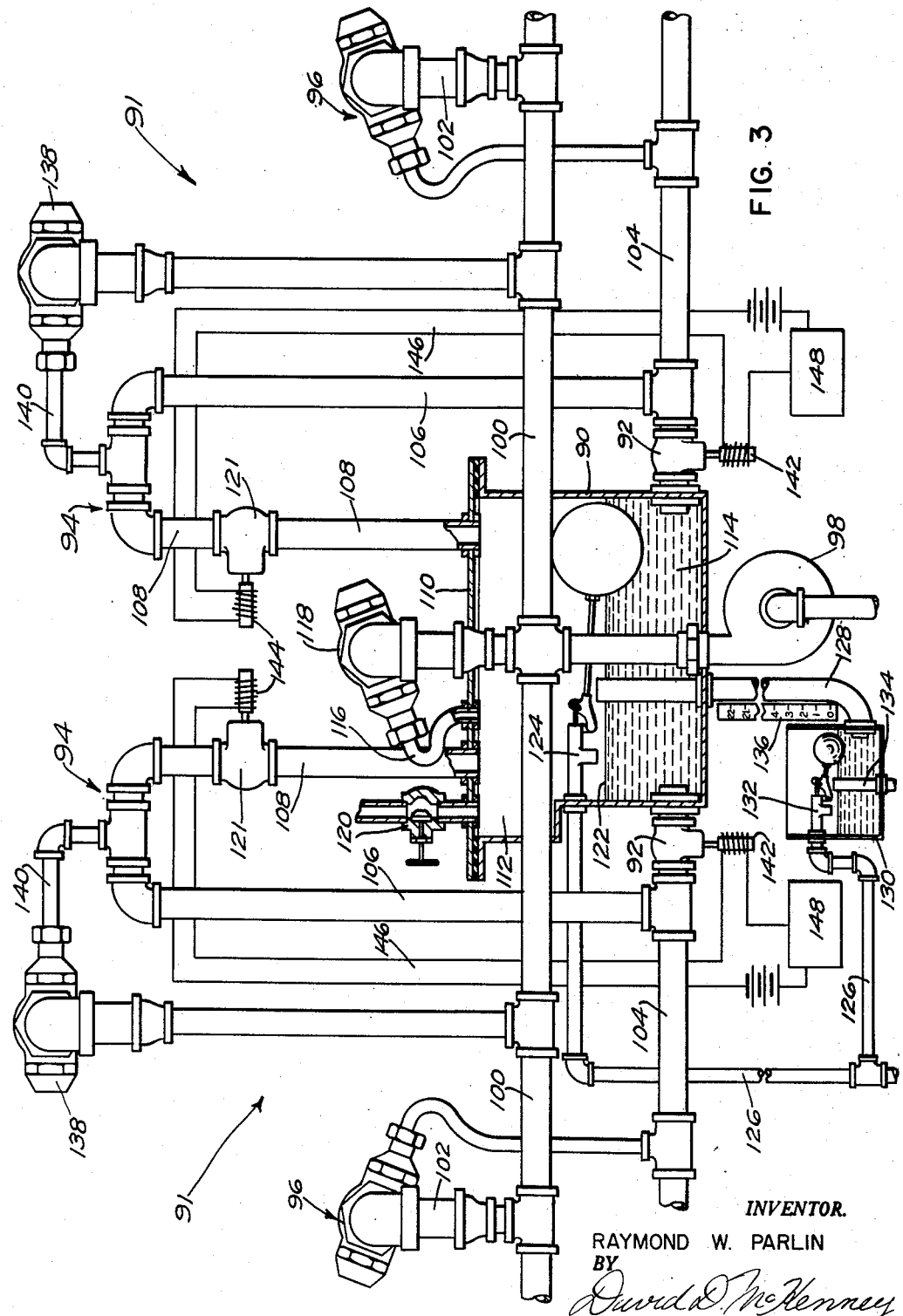

United States Patent Office 2,913,184
Patented Nov. 17, 1959

2,913,184
ON-OFF HUMIDIFYING SYSTEMS

Raymond W. Parlin, Providence, R.I., assignor to Grinnell Corporation, Providence, R.I., a corporation of Delaware Application July 17, 1956, Serial No. 598,268

19 Claims. (Cl. 236—44)

The present invention relates to improvements in systems for humidifying the atmosphere in an enclosure. More particularly it has to do with such systems employing suction-type atomizers which are turned on and off to provide intermittent discharge and with apparatus associated with the supply of liquid to be atomized for turning the atomizers on and off preferably in accordance with variations in atmospheric conditions. This apparatus employs and the present invention provides an on and off valve between the liquid supply and the atomizers, and a vacuum is applied to a surface of the liquid downstream of the on and off valve when it is turned off. This vacuum is removed when the on and off valve is turned on.

With such an arrangement the atomizers may be shut off very quickly by shutting off the on and off valve and applying the vacuum and without the necessity of turning the flow of gas to the atomizer on and off. Accordingly this arrangement makes possible and the present invention provides a low pressure humidifying system employing suction-type atomizers and low pressure, non-lubricated rotary type pumps operating at pressures substantially less than in conventional systems.

This apparatus is adapted to be employed in installations in which the reservoir tank supplying the system is provided with a vacuum which is modulated in accordance with changes in atmospheric conditions to regulate the rate of discharge of the atomizers when the atomizers are turned on. It is also adapted to be employed in installations in which several atomization systems are supplied from a single liquid reservoir with or without a vacuum to turn on and off the discharge of each system independently.

Turning on and shutting off discharge by the above-mentioned valve and vacuum in the liquid line make possible a commercially feasible suction-type atomizer humidifying system of the on and off type in which the flow of air to the atomizers is substantially continuous and a commercially feasible suction-type atomizer humidifying system employing a non-lubricated rotary type pump for compressing the gas flowing through the atomizer and employing substantially lower pressures than in conventional humidifying systems.

Accordingly, it is one object of the present invention to provide apparatus for turning on and off the discharge from suction-type atomizers by respectively turning on and off a valve controlling the flow of liquid to be atomized from a liquid reservoir and by respectively releasing and applying a vacuum on a surface of the liquid downstream of such valve.

Another object is to provide apparatus of the kind described wherein said valve is opened and the vacuum is released substantially simultaneously and wherein the valve is closed and the vacuum is applied substantially simultaneously.

Another object is to provide apparatus of the kind described in which the valuve and vacuum are controlled in accordance with the conditions of the atmosphere.

Another object is to provide apparatus of the kind described in which the vacuum is sufficient to rapidly neutralize the suction of the atomizers when the valve is operated to turn off the liquid and thereby rapidly stop discharge.

Another object is to provide a commercially feasible suction type humidifying system employing a valve and vacuum as described, employing a non-lubricated rotary type pump for compressing the gas flowing through the atomizer, employing substantially lower pressures than in conventional humidifying systems, employing atomizers which are not of the self-cleaning type and employing a vacuum regulated in accordance with atmospheric conditions.

Another object is to provide an improved and more efficient system employing suction-type atomizers and control apparatus for use with the same.

Other objects will appear hereinafter.

The accompanying drawings show and the following specification describes preferred embodiments of the present invention. They are merely illustrative of the invention and it is not intended that it be limited thereto.

In the accompanying drawings:

Fig. 1 is an elevation partly in section and somewhat diagrammatic of apparatus embodying the present invention;

Fig. 2 is a section taken along the line 2—2 of Fig. 1;

Fig. 3 is an elevation partly in section and somewhat diagrammatic of another embodiment of the invention.

Referring now more particularly to Figs. 1 and 2 of the drawing 10 represents several of a plurality of atomizers which are distributed throughout an enclosure and which communicate through a riser 12 and pipe 14 with a conventional rotary, non-lubricated, centrifugal pump 16. Also communicating with pump 16 through a pipe 18 is an aspirator 20 which preferably has the same construction as atomizer 10 and the suction side of which communicates through pipe 22 with a standpipe 24 which has the shape of an inverted U one leg 26 of which communicates with a water distributing pipe 28. Atomizers 10 also communicate through water risers 30 and water distributing pipe 28 with a reservoir tank 32 containing liquid 34 which is supplied to the tank by water inlet pipe 36 and the level of which is controlled by a float valve 38 which is connected to a float 40 through a connection 42. Tank 32 is open to the atmosphere and is provided with a level indicator 44 and an over-flow pipe 46.

Located in pipe 28 between standpipe 24 and tank 32 is a biased closed on and off solenoid valve 48 which is controlled by a solenoid 50. Leg 27 of standpipe 24 also has a biased closed on and off solenoid valve 52 which is controlled by a solenoid 54. Electrically connected to solenoids 50 and 54 through circuit 56 and a source of electrical energy 58 is a conventional on and off humidity controller 60 which is responsive to changes in the conditions of the atmosphere to automatically complete circuit 56 when the relative humidity of the atmosphere falls below a predetermined amount whereby solenoids 50 and 54 are simultaneously actuated and valves 48 and 52 are simultaneously opened. Controller 60 automatically opens circuit 56 when the relative humidity of the enclosure rises above a predetermined amount, whereby the biased closed valves 48 and 52 close.

Atomizer 10 is a low pressure atomizer (see Fig. 2) and comprises a body 64 having a central air chamber 66 which is in communication with air outlet port 68 and through which air passes from air inlet port 70. Port 68 is covered by a cap member 72 having a central aperture 74. Concentrically located in this aperture and extending therethrough from the interior of the body is a nozzle member 76 which is mounted on a plug 78 and which forms with aperture 74 an atomization orifice. Air passing through this orifice draws water from the supply tank 32 through riser 30 and passages 80 and 82 of plug 78 and nozzle 76 into the air stream where it is atomized and discharged into the enclosure.

16 is a non-lubricated, rotary type, low pressure pump or blower, as for example, a centrifugal pump. It has been found when such pumps are used that deposits do not form to any appreciable extent in the orifices of the atomizers and consequently relatively inexpensive, low pressure atomizers can be used like those shown in the drawings which do not have self-cleaning elements operated to remove deposits by turning on and off the flow of gas thereto.

In operation air at a relatively low pressure is continuously pumped by means of pump 16 through distributor pipe 14 and air risers 12 to and through passages 70 and 68 and orifice of atomizers 10 formed by nozzle 76 and aperture 74 and then into the atmosphere, whereby a suction is created at the forward end of nozzle 76. Air pump 16 also continuously pumps air through pipe 18 and through aspirator 20, whereby air is aspirated out of standpipe 24 through pipe 22 and aspirator 20 into the atmosphere.

When the humidity of the air falls below a certain desired amount humidity controller 60 automatically closes the circuit 56 which opens valves 48 and 52. Controller 60 maintains circuit 56 closed and hence maintains valves 48 and 52 open so long as the relative humidity remains below the desired amount. With valves 48 and 52 open, the suction created at the forward end of passage 76 of atomizers 10 by the flow of air through the orifice sucks liquid from tank 32, through open valve 48, water distributing pipe 28, liquid risers 30 and passages 80 and 82 of atomizers 10 into the air stream, where it is atomized and discharged into the atmosphere. Because the valve 52 is open the standpipe 24 is open to the atmosphere and consequently even though air is removed from the standpipe by aspirator 20 the vacuum producing effect thereof is neutralized and the pressure in standpipe 24 is substantially atmospheric. As water flows from tank 32, float 40 controls float valve 38 through connection 42 to permit water to flow into the tank at approximately the same rate it is moved out of the tank, whereby substantially the same liquid level is maintained in tank 32.

Water continues to be discharged, until the relative humidity of the atmosphere rises above a certain desired amount, whereupon humidity controller 60 automatically opens the circuit 56, whereby solenoids 50 and 54 are deenergized and the valves 48 and 52 are closed simultaneously. Controller 60 maintains circuit 56 open, and the valves 48 and 52 remain closed so long as the relative humidity in the enclosure is above the desired amount. Air continues to be pumped through the atomizers 10 and aspirator 20 by pump 16 and consequently air continues to be withdrawn from standpipe 24 and a suction continues to be exerted on the end of passage 82.

Upon the simultaneous closing of valves 48 and 52 the supply of water from tank 32 to atomizers 10 is cut off and the removal of air from standpipe 24 through pipe 22 and aspirator 20 causes sufficient vacuum to be created and maintained in standpipe 24 to rapidly neutralize the suction created on the end of passage 82 by the flow of air through atomizers 10, whereby discharge of water is rapidly stopped. Since valve 52 is closed simultaneously with valve 48 the vacuum in standpipe 24 has no effect on the liquid in the reservoir tank 32. In the event that the flow of air through atomizers 10 is discontinued during off periods it is necessary to provide some kind of a check valve in the atomizers or in the water line downstream of standpipe 24 to prevent air from being sucked through atomizers 10 into the standpipe 24.

Any conventional type of aspirator and atomizer may be used. However, because the pressure provided by pump 16 is relatively low it is advantageous to use an inexpensive, low pressure type atomizer and aspirator. Furthermore, any conventional type of humidity controller and any conventional kind of on and off valves 48 and 52 can be used. The system shown in Fig. 1 provides a novel means, located in the liquid conduit for effectively and automatically stopping and starting discharge in response to changes in atmospheric conditions without cutting off the flow of air to the atomizers.

The volume of the standpipe 24 in which the vacuum is created by the aspirator 20 should be preferably small enough to allow this aspirator to build up in a very short time a vacuum sufficient to neutralize the suction of atomizer 10.

Fig. 3 illustrates an embodiment of the present invention wherein a single reservoir tank 90 supplies water for a plurality of atomizer systems 91 each of which has its own water valve 92 (corresponding to valve 48 in Fig. 1) and its own standpipe 94 (corresponding to 24 in Fig. 1) to independently turn on and off its system. Each system has a plurality of atomizers 96 through which air is pumped from a low pressure rotary type, non-lubricated pump 98 connected to the atomizers 96 by pipe 100 and risers 102. Water is thus drawn from tank 90 through a pipe 104 having the valve 92 located therein and having one leg 106 of the standpipe 94 connected thereto downstream of the valve. The other leg 108 of the standpipe is connected with tank 90 which, unlike the tank shown in Fig. 1, is closed in air tight manner with a cover 110. Gas is withdrawn from the space 112 in this tank above the surface of the liquid 114 therein through pipe 116 by an atomizer 118 actuated by air flowing from the pump 98. The vacuum produced in the tank by the aspirator 118 is regulated by the adjustable bleed valve 120. The effect of this vacuum is to reduce the rate of discharge from atomizers 96, when valve 92 is open and valve 121 (corresponding to 52 in Fig. 1) is also open, to a rate less than that which is attained when there is no such vacuum, e.g. when the valve 120 is fully opened.

The rate of discharge decreases with increases in vacuum caused by decreasing the size of bleed valve opening.

The level 122 of water 114 in the tank 90 is maintained by a conventional float valve 124 in a liquid supply line 126. A transparent overflow pipe 128 is provided leading to an overflow tank 130 which has another conventional float valve 132 in pipe 126 for maintaining a level of water above the lower end of overflow pipe 128. Tank 130 has its own overflow pipe 134, and pipe 128 has a graduated scale 136 to show the amount of vacuum in tank 90.

Air is withdrawn from standpipe 94 through riser 140 by aspirator 138 actuated by air flowing from pump 98. Pipe 140 is connected to the standpipe somewhere between valve 121 and pipe 104.

As in Fig. 1, valves 92 and 121 are simultaneously opened by solenoids 142 and 144 when the circuit 146 is closed by humidistat 148, and are simultaneously closed when circuit 146 is opened by humidistat 148. When the valves are open water is free to flow to the aspirators and the pressure in standpipe 94 becomes substantially the same as in tank 90. When the valves are closed the water supply to the atomizers is shut off and a vacuum is built up in the standpipe 94 between closed valve 121 and pipe 104. As in Fig. 1 this vacuum causes the discharge from the atomizers 96 to shut off rapidly after valve 92 is closed.

Each of the systems 91 is located in a different part of the enclosure to be humidified or in a different enclosure and is turned on and shut off independently in accordance with the particular conditions where the system is located. However, all the systems are supplied by the single tank 90 and the rate of discharge in each of the systems when the atomizers are on is controlled by the vacuum in this tank. Any suitable devices may be employed to automatically control the size of the opening in bleed valve 120 in accordance with atmospheric conditions. The vacuum in chamber 112 will be slightly greater with both valves 121 open than when only one of them is open but the difference is not great enough to be of any importance.

I claim:

1. Apparatus for use with a liquid atomizer in which liquid is moved from a supply thereof through a conduit for said liquid to said atomizer, where it is atomized and discharged by the flow of a fluid through said atomizer, comprising means associated with said conduit for said liquid and responsive to variations in atmospheric conditions for intermittently turning on and shutting off the discharge of liquid, said last mentioned means comprising a shut off valve in said liquid conduit between the liquid supply and the atomizer, means for maintaining a vacuum on a surface of said liquid downstream of said valve while said valve is closed and means for reducing said vacuum while said valve is open.

2. An apparatus according to claim 1 wherein said fluid continuously flows through said atomizer during the on and off periods and said vacuum producing means comprises means for providing a sufficient vacuum to neutralize the suction exerted on the liquid downstream of the closed valve by the flow of said fluid through the atomizer and thereby to stop the discharge of said liquid and said means for reducing said vacuum comprises means for reducing said vacuum sufficiently to permit said suction to discharge said liquid.

3. An apparatus according to claim 2 also including rotary, non-lubricated, low pressure fluid pump means for continuously pumping said fluid to said atomizer during the on and off periods.

4. Apparatus for use with a suction type atomizer in which the flow of a fluid through a conduit for said fluid to and through an atomization region effects the discharge, atomization and movement of the liquid to be atomized from a container forming a reservoir for said liquid through a conduit for said liquid to said atomization region, comprising means associated with said conduit for said liquid and responsive to variations in atmospheric conditions for intermittently turning on and shutting off the discharge of liquid, said last mentioned means comprising on and off valve means in said liquid conduit downstream of said container, means for closing and opening said valve means, a standpipe in said liquid conduit located downstream of said valve means, said standpipe having means for maintaining a vacuum therein while said valve means is closed and for reducing said vacuum while said valve means is open.

5. An apparatus according to claim 4 wherein fluid passes continuously through said atomizer during said on and off periods and said vacuum producing means comprises means for creating a sufficient vacuum to neutralize the suction exerted on the liquid downstream of the closed valve by the flow of said fluid through the atomizer and thereby to stop the discharge of said liquid and said means for reducing said vacuum comprises means for reducing said vacuum sufficiently to permit said suction to discharge liquid.

6. An apparatus according to claim 5 also including a rotary, non lubricated, low pressure pump for continuously pumping fluid through said atomizer.

7. An apparatus according to the apparatus of claim 5 wherein said vacuum producing means comprises an aspirating means for aspirating gas out of said standpipe and said vacuum reducing means comprises means for reducing the vacuum effect created in the standpipe by said removal of gas therefrom.

8. An appartaus according to claim 7 wherein said means for reducing the vacuum effect comprises a release conduit for providing communication between the interior of said standpipe and the atmosphere, said release conduit containing on and off valve means, said apparatus also including means for simultaneously closing and simultaneously opening said on and off valve means in said release conduit and said on and off valve means in said conduit for said liquid in response to variations in atmospheric conditions.

9. An apparatus according to the apparatus of claim 7 wherein means is provided for maintaining a vacuum in said container and for modulating said last mentioned vacuum and communication is provided between the air space in said standpipe and the air space in said container, an on and off valve for shutting off and turning on said communication and means for substantially simultaneously closing and simultaneously opening said last mentioned on and off valve and said on and off valve in the liquid conduit in response to variations in atmospheric conditions.

10. An apparatus according to the apparatus of claim 5 wherein means is provided for regulating the rate of discharge during on periods in accordance with the condition of the atmosphere, said last mentioned means including means for maintaining a vacuum on the surface of the liquid in the container and means for modulating said vacuum.

11. An atomizing system for maintaining a desired relative humidity within an enclosure, said system comprising at least one aspirating atomizer adapted for intermittent operation as determined by the demand for moisture, a liquid shut off valve interposed between the atomizers and a liquid supply and a standpipe interposed in the liquid supply line downstream of said valve, means for imposing on the surface of the liquid in the standpipe sufficient vacuum to neutralize the suction on the liquid created by the aspirating atomizers, and means responsive to the condition of the atmosphere for intermittently imposing such vacuum and closing the liquid shut off valve, to interrupt the discharge of atomized liquid from the atomizers, during continuous discharge of the atomizing medium through the atomizers.

12. A system according to claim 11 including a container forming a reservoir for said liquid, said valve being downstream of said container, means also responsive to the condition of the atmosphere for intermittently turning on said valve and reducing said vacuum imposed on said surface to turn on discharge of atomized liquid, said vacuum imposing means comprising means for aspirating gas out of said standpipe.

13. The system of claim 12 wherein said vacuum reducing means comprises a release conduit communicating between the interior of said standpipe and the atmosphere, an on and off valve in said release conduit and means for intermittently opening and closing said on and off valve and said shut off valve substantially simultaneously in response to variations in the conditions of the atmosphere.

14. A combination according to claim 12 including low pressure, rotary, non-lubricated pump means for continuously pumping atomizing medium through said atomizer.

15. An apparatus according to claim 12 wherein means is provided for regulating the rate of discharge during on periods in accordance with the conditions of the atmosphere, said last mentioned means including means for maintaining a vacuum on the surface of the liquid in the container and means for modulating said vacuum.

16. An apparatus in accordance with claim 15 wherein communication is provided between the air space in said standpipe and the air space in the container and including on and off valve for shutting off and turning on said communication and means responsive to the condition of the atmosphere for intermittently turning on said on and off valve and said shut off valve to turn on discharge at a regulated rate and for shutting off said on and off valve and said shut off valve to shut off discharge.

17. An apparatus according to claim 12 wherein said container supplies a plurality of systems of atomizers, each of which is located in a different area and has its own standpipe and shut off valve for intermittently turning on and off discharge of the atomizers in that system independently of the other systems and in accordance with the conditions of the atmosphere in the particular area into which liquid is discharged by that system.

18. An apparatus according to claim 15 wherein said container supplies a plurality of systems of atomizers, each of which is located in a different area and has its own standpipe and shut off valve for intermittently turning on and off discharge of the atomizers in that system independently of the other systems and in accordance with the conditions of the atmosphere in the particular area into which liquid is discharged by that system.

19. The apparatus of claim 15 including a low pressure, rotary, non lubricated pump for pumping atomizing medium through the atomizers.

References Cited in the file of this patent

UNITED STATES PATENTS

| | | |
|---|---|---|
| 400,758 | Easton | Apr. 2, 1889 |
| 1,270,159 | Hodge | June 18, 1918 |
| 2,650,003 | Coleman | Aug. 25, 1953 |
| 2,675,217 | Slason | Apr. 13, 1954 |

FOREIGN PATENTS

| | | |
|---|---|---|
| 555,336 | Germany | July 21, 1932 |